United States Patent
Rodwin et al.

[11] Patent Number: 5,812,819
[45] Date of Patent: Sep. 22, 1998

[54] REMOTE ACCESS APPARATUS AND METHOD WHICH ALLOW DYNAMIC INTERNET PROTOCOL (IP) ADDRESS MANAGEMENT

[75] Inventors: Andrew S. Rodwin, Boxborough; Jonathan H. Wenocur, Brighton; Michael G. Feinstein, Bedford, all of Mass.

[73] Assignee: Shiva Corporation, Bedford, Mass.

[21] Appl. No.: 462,819

[22] Filed: Jun. 5, 1995

[51] Int. Cl.⁶ ..................................... G06F 15/16
[52] U.S. Cl. .............. 395/500; 395/187.01; 395/188.01; 1/1
[58] Field of Search ..................... 395/500, 601, 395/200.01, 200.09, 200.1, 200.12, 200.06, 186, 187.01, 188.01

[56] References Cited

U.S. PATENT DOCUMENTS

| | | | |
|---|---|---|---|
| 4,989,204 | 1/1991 | Shimizu | 370/94.1 |
| 5,159,592 | 10/1992 | Perkins | 370/85.7 |
| 5,181,200 | 1/1993 | Harrison | 370/85.1 |
| 5,276,680 | 1/1994 | Messenger | 370/85.1 |
| 5,410,543 | 4/1995 | Seitz et al. | 370/85.13 |
| 5,410,691 | 4/1995 | Taylor | 395/600 |
| 5,553,239 | 9/1996 | Heath et al. | 395/187.01 |
| 5,598,536 | 1/1997 | Slaughter et al. | 395/200.16 |

FOREIGN PATENT DOCUMENTS

| | | |
|---|---|---|
| A 0 483 547 | 5/1992 | European Pat. Off. |
| 0 513 484 | 11/1992 | European Pat. Off. |

OTHER PUBLICATIONS

"Ipv6 Stateless Address Autoconfiguration", by Susan Thomson, Mar. 24, 1995, pp. 1–18.

Copy of International Search Report dated Sep. 2, 1996.

"DHCP for Mobile Networking with TCP/IP" Charles Perkins and Tanyirala Jagannadh, Apr. 1995 IEEE pp. 255–261.

"A Mobile Networking System based on Internet Protocol" Charles Perkins and Pravin Bhagwat, Oct. 1994 IEEE Personal Communications pp. 32–41.

"Network Working Group, Request for Comments: 951" p. 11, Bill Croft and John Gilmore, Sep. 1985.

*Primary Examiner*—Kevin J. Teska
*Assistant Examiner*—A. S. Roberts
*Attorney, Agent, or Firm*—Fish & Richardson P.C.

[57] ABSTRACT

A user at a remote computer is provided access to a computer network by a remote access device coupled to the network. The remote access device receives from the remote computer a username which uniquely identifies the user on the network. The remote access device then obtains an internet protocol (IP) address from a server on the network, which server dynamically assigns the IP address based on the username. The IP address uniquely identifies the remote computer on the network, and it is needed by the remote computer to communicate on the network. If the user at the remote computer disconnects, or is disconnected, from the network and then subsequently attempts to re-gain access to the network by sending the same username to either the same or a different remote access device coupled to the network, that remote access device obtains the same IP address from the server. The user at the remote computer thus is provided with the same IP address by the server on the network when the user disconnects and then later reconnects to the network even if each of the two connections is via a different remote access device.

20 Claims, 6 Drawing Sheets

REMOTE ACCESS APPARATUS AND METHOD WHICH ALLOW DYNAMIC INTERNET PROTOCOL (IP) ADDRESS MANAGEMENT

FIELD OF THE INVENTION

This invention relates to an apparatus and method for providing a remote user at a remote computer with access to a local computer network, and more particularly, to interoperating with a dynamic internet protocol (IP) address assignment server to provide the user with the same IP address after the user has disconnected and then later reconnected to the network.

BACKGROUND OF THE INVENTION

The client-server computer networking model allows organizations of all sizes to utilize group productivity products such as e-mail. Many business organizations have grown to rely heavily on network services. Employees who travel typically need to access the same network services and resources provided to them at work. Field offices also frequently need to access the headquarter's network services. The term "telecommuter" has been used to describe an employee who stays at home and conducts business by accessing the network services provided at the traditional worksite. These types of users are sometimes referred to as "remote" because they typically are located in a physically remote place from the networks and because they do not connect to the networks locally or directly. Remote users typically connect to the networks via telephone lines. The terms "remote access" and "remote networking" are frequently used to identify the situation in which a remote user accesses a computer network over analog or digital telephone lines.

A remote user generally can utilize any type of computer to access the network. The computer can be, for example, a personal computer, a workstation, or a portable computer such as a laptop computer or a notebook computer. Also, the computer can be, for example, an IBM PC or compatible, an Apple Macintosh, or a Unix-based computer. The user typically connects a modem, or similar communications adapter, to a serial port of the computer. The modem connected to the user's remote computer communicates over the telephone lines with another modem which is coupled to a device coupled to the network. The other modem and the device are located at the network which the remote computer is attempting to access. The device is coupled directly to the network. It is this device which provides the remote computer with controlled access to the network and the services and resources thereon. The device typically is referred to as a "remote access server" or a "remote access device," and it generally includes at least one serial port for connecting to the other modem, at least one port for connecting to the network, and electronics which include at least a microprocessor and memory. A typical remote access device provides a point of network access for one or more remote computers.

It is desirable for the remote access device to have a variety of features including the ability to interoperate with a dynamic internet protocol (IP) address assignment/management server such as a Dynamic Host Configuration Protocol (DHCP) server. With some protocols such as TCP/IP, any node on the network, including a remote computer which dials into the network, requires an IP address to communicate on the network. By having one or more DHCP servers on the network, there is the potential that IP addresses can be assigned dynamically to all nodes on the network. In addition to the IP addresses, DHCP servers generally also have the potential to provide dynamically to the network nodes fairly extensive configuration information such as standard IP parameters, other standard parameters, and vendor-specific information. In general, DHCP provides dynamic, centralized management of IP addresses on the network, and it eliminates the need for a network manager to manually assign and track IP addresses for each network node.

Using dynamic IP address assignment/management servers (e.g., DHCP servers) on the network to assign IP addresses (and possibly other configuration information) dynamically to network nodes becomes problematic when one or more of the nodes are remote computers dialing into the network via one or more remote access devices. The problems stem from the fact that upon initialization (e.g., a previously unconnected node connects directly to the network and boots-up) the typical mode of operation is for the dynamic IP address assignment/management server(s) to communicate with nodes coupled directly to the network to obtain a unique hardware-level address (e.g., a MAC address on the network interface card) for each such node. Each remote access device coupled directly to the network has at least one (e.g., 16) such unique hardware-level address. Because more than one remote computer can dial into a single remote access device to gain access to the network, this limited number of hardware-level addresses of the remote access device is insufficient to identify uniquely each of the remote computers accessing the network via that remote access device. Thus, the dynamic IP address assignment/management server(s) cannot identify uniquely and deterministically each of the remote computers from the hardware-level addresses obtained during initialization.

It is required that any network node requesting an IP address from a dynamic IP address assignment/management server must furnish a unique identifier. Further, it is desirable that each remote computer, regardless of the remote access device to which it has dialed-in to gain access to the network, be uniquely and deterministically identifiable by the dynamic IP address assignment/management server(s) because then each remote computer can be assigned the same IP address even if the user disconnects from the network and then later reconnects, via the same or a different remote access device, before the dynamically-assigned, server-supplied IP address lease expires. If IP address continuity is maintained for dial-in remote computers in this way, the remote users can seamlessly access and re-access the network and utilize its services and resources without the involvement of the network manager.

SUMMARY OF THE INVENTION

It is an object of this invention to allow remote users to dial-in to and gain access to a local computer network via a remote access device coupled directly to the network.

It also is an object of this invention to obtain an internet protocol (IP) address for each remote user from one or more dynamic IP address assignment/management servers coupled directly to the network and then to provide those IP addresses to the dialed-in remote users. Other configuration information, in addition to the IP addresses, can be obtained from the server(s) and then provided to the remote users. The servers can be Dynamic Host Configuration Protocol (DHCP) servers.

It is a further object of the invention to provide remote access devices which interoperate with the dynamic IP address assignment/management server(s) on the network such that a remote user is provided with the same IP address if that user disconnects, or is disconnected, from the network and then later reconnects before the lease expires on that dynamically-assigned, server-supplied IP address. The remote user is provided with the same IP address even if the user reconnects to the network via a different remote access device than the one the user was connected to prior to disconnect. That is, IP address continuity is maintained across remote access devices. This feature allows the remote user to continue a dial-in session with minimal interruption.

It is yet another object of the invention to allow the dynamic IP address assignment/management server(s) on the network to identify uniquely and deterministically each of the remote users accessing the network via the remote access devices. With the present invention, it is not necessary to statically assign IP addresses, and therefore there is no need for a network manager to manually assign and track IP addresses for each remote user.

In general, the invention involves providing a user at a remote computer with access to a local computer network via a remote access device coupled to the network. The remote access device receives from the remote computer a username (entered by the user at the remote computer) which uniquely identifies the user on the network. The remote access device then obtains an internet protocol (IP) address from a server on the network, which server dynamically assigns the IP address based on the username. In a preferred embodiment, the server is one or more Dynamic Host Configuration Protocol (DHCP) servers. The IP address uniquely identifies the remote computer on the network, and it is needed by the remote computer to communicate on the network. If the user at the remote computer disconnects, or is disconnected, from the network and then subsequently attempts to re-gain access to the network by sending the same username to either the same or a different remote access device coupled to the network, that remote access device obtains the same IP address from the server. The user at the remote computer thus is provided with the same IP address by the server on the network when the user disconnects and then later reconnects to the network even if each of the two connections is via a different remote access device.

To obtain the IP address from the server, the remote access device generates a client identifier, based on the username, which uniquely identifies the remote computer on the computer network. The remote access device then sends the client identifier to the server which dynamically assigns the IP address to the remote computer based on the client identifier. The remote access device receives the IP address from the server and provides it to the user's remote computer. The remote access device thus is a proxy for the remote computer. In a preferred embodiment, the remote access device generates the client identifier by concatenating the username with a predetermined string.

In general, for proper operation according to the invention, each user on the network at the same time must have a unique username. With unique usernames, the invention allows the same IP address to be obtained after disconnection and upon reconnection in the dynamic IP address assignment environment. If two or more users desire to dial in to the network at the same time using the same username, each of these users can obtain an IP address from the dynamic IP address assignment server(s) so they can communicate on the network, but in general none of these users will be provided with the same IP address after disconnection from and upon reconnection to the network because the server cannot now uniquely identify each of the remote users. Thus, users can share usernames and still obtain dynamically-assigned, server-supplied IP addresses by dialing into the remote access devices, but many of the benefits of the invention (e.g., the ability to obtain the same IP address after disconnect and upon reconnect) will not be available if usernames are shared.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1A:
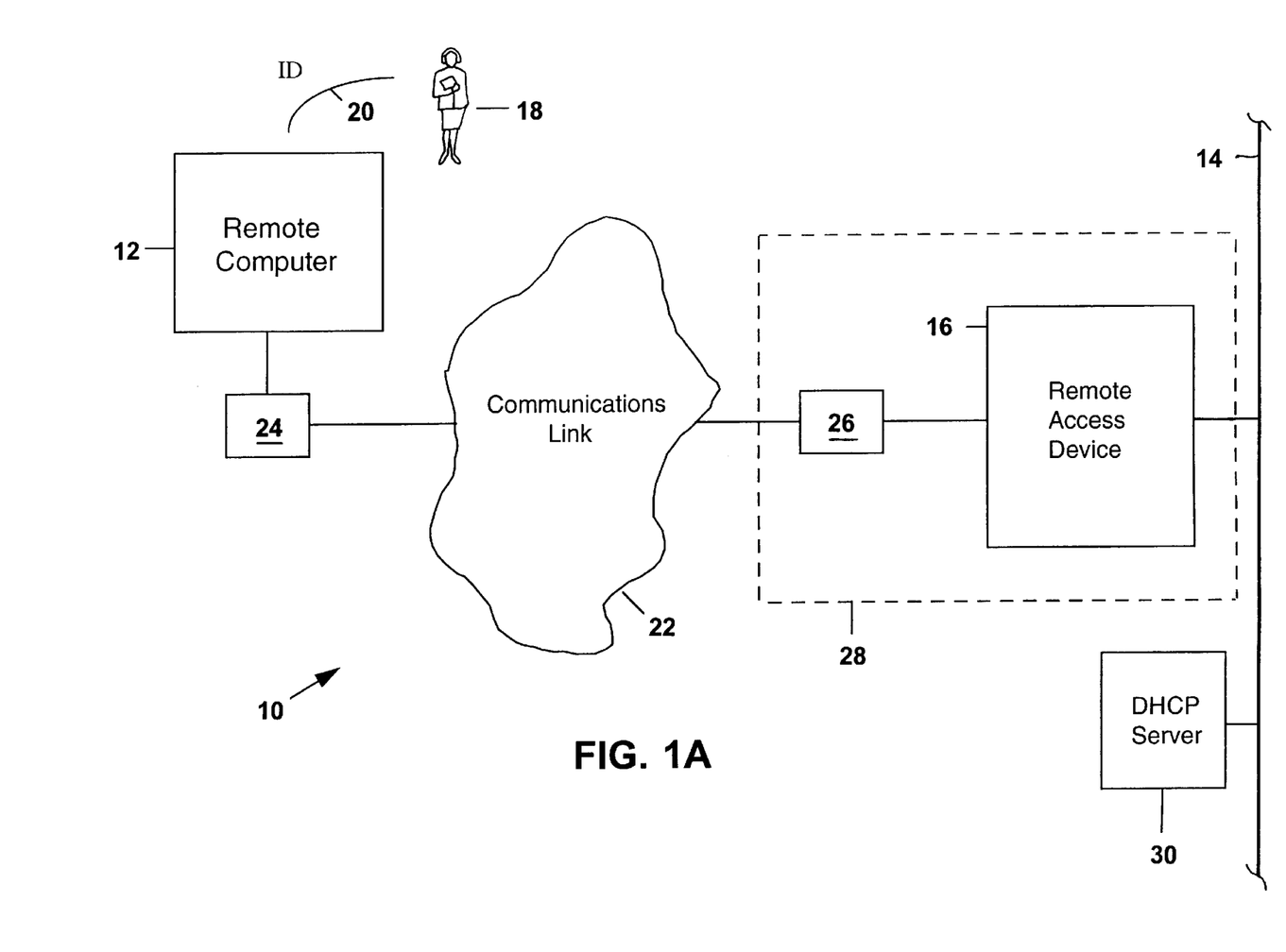
FIG. 1A is a simplified diagram of a remote access system in which a remote access device according to the invention provides a remote user at a remote computer with access to a local computer network.

Referring to FIG. 1A, in a remote access system 10, a remote computer 12 is allowed access to a local computer network 14 by a remote access device 16. As will be described in more detail later with reference to FIGS. 1B and 3, the remote access device 16 is itself a powerful programmable computer which provides a point of network access for one or more remote users/computers 18,12. Only one remote user 18 and one remote computer 12 is shown in FIG. 1A for simplicity. In the disclosed embodiment, the remote access device 16 is a LanRover which is available from Shiva Corporation of Burlington, Mass. A remote user 18 at the remote computer 12 initiates an attempt to gain access to the network 14 (and the network services and resources available thereon) via the remote access device 16 by entering a username 20 into the remote computer 12. The username 20 identifies the user 18, and it typically is a predetermined code (e.g., an alpha or alphanumeric character string) assigned to the user 18 by a network manager having general responsibility for the network 14.

The username 20 entered by the remote user 18 is sent by the remote computer 12 to the remote access device 16 over telephone lines 22. The term telephone lines 22 is used herein to mean any digital and/or analog communication link or links used to transmit voice and/or data including wireless links and cellular data links such as Cellular Digital Packet Data (CDPD). In the disclosed embodiment, a modem 24 is connected to the remote computer 12, and another modem 26 is connected to the remote access device 16. The modems 24, 26 allow the remote computer 12 and the remote access device 16 to communicate over the telephone lines 22. Note that the modem 26 connected to the remote access device 16 could be part of the remote access device 16 (e.g., included within the device's housing), as indicated by the dotted-line box 28 enclosing the remote access device 16 and the modem 26 connected thereto. Also note that the modems 24, 26 could be Integrated Services Digital Network (ISDN) terminal adapters if the telephone lines 22 are the ISDN, or the modems 24, 26 could be any of a variety of other switched-access devices.

The remote access device 16 receives the username 20 which was entered by the remote user 18 and sent by the remote computer 12. An optional user authentication procedure may occur at this time where a remote user proves his or her identity by entering a password, by reference to an authentication server database, or by any other method. Once the remote user is authenticated, that remote user is granted access to the network. Further authorization may occur in order for an authenticated user to become an authorized user and be granted access to specific network services. In any event, the remote access device 16 passes an identifier which includes the username 20 over the network 14 to a dynamic Internet Protocol (IP) address assignment/management server 30 coupled to the network 14. While the server 30 can be realized by a single server or a set of servers, one server 30 is shown in FIG. 1A for simplicity. The server 30 dynamically assigns IP addresses to nodes coupled directly to the network 14 such as the remote access device 16. With some protocols, such as TCP/IP, the remote computer 12 must have an IP address in order to communicate on the network 14 and access the network services and resources available thereon.

The dynamic IP address assignment/management server 30 eliminates the need for a network manager to manually assign and track IP addresses on the network 14. In a preferred embodiment, the server 30 is a Dynamic Host Configuration Protocol (DHCP) server. DHCP provides dynamic, centralized management of IP addresses. DHCP is an Internet standard for dynamically passing configuration information, including IP addresses, to nodes coupled directly to a Transmission Control Protocol/Internet Protocol (TCP/IP) network. In addition to the IP addresses, the configuration information can include standard IP parameters, other standard parameters, and vendor-specific information.

After the remote access device 16 obtains an IP address from the server 30, the remote access device 16 sends the IP address to the remote computer 12 via, for example, the modems 24, 26 and the telephone lines 22. The remote computer 12 gains access to the network 14 through the remote access device 16 and uses the IP address to communicate with, and utilize the services and resources available on, the network 14.

Figure 1B:
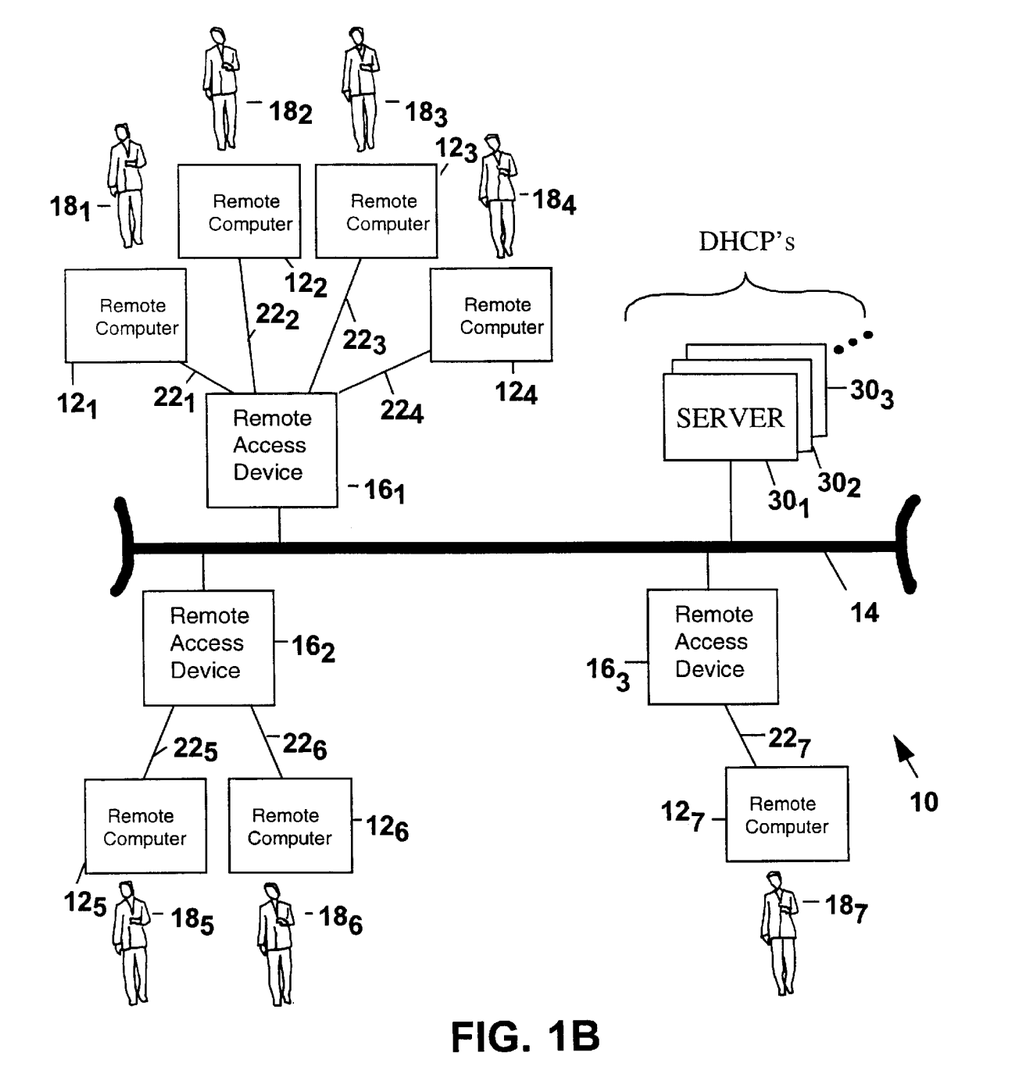
FIG. 1B is a diagram of a remote access system having a plurality of remote access devices and a plurality of remote users at a plurality of remote computers.

Referring to FIG. 1B, the remote access system 10 can actually include one or more users 18, remote computers 12, remote access devices 16, and servers 30 as alluded to previously.

Figure 2:
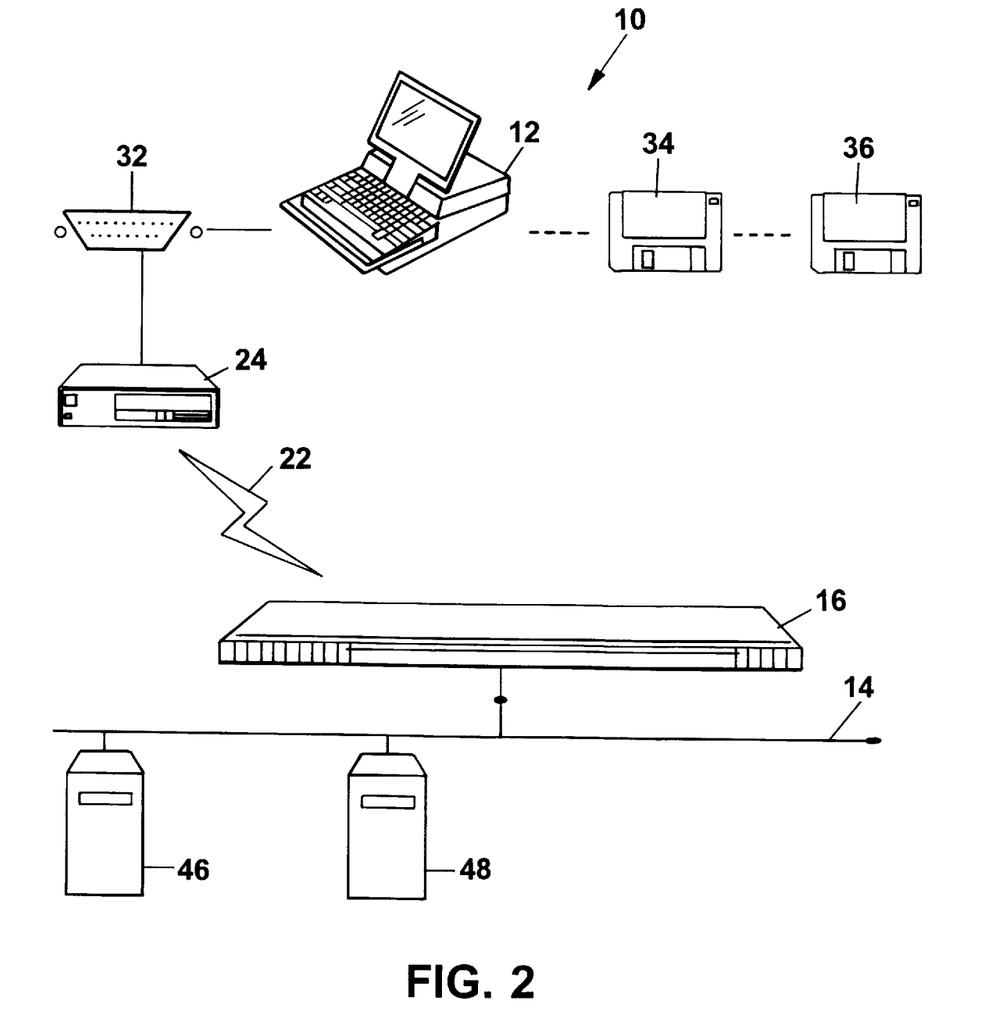
FIG. 2 is a diagram of a remote access system shown in more detail than the system shown in FIG. 1A.

The remote access system 10 of FIG. 1A is shown in more detail in FIG. 2. Referring to FIG. 2, the remote computer 12 is a portable laptop computer. In general, the remote computer 12 can be any type of portable computer (e.g., a laptop or a notebook), workstation, or personal computer (e.g., an IBM PC or compatible, an Apple Macintosh, or a Unix-based computer). The remote computer 12 generally must be able to function as a stand-alone computer system when not connected to a network, and as a full network node when it is dialed-in to the network 14 through the remote access device 16. For a remote Macintosh system, it generally is preferred that the computer have at least a 25 MHz 68030 processor. For a remote PC system, it generally is preferred that the computer have at least a 25 MHz 486 processor.

The remote access system 10 described herein is not to be confused with a remote control system. In a remote control system, a remote user dials-in to the local network with his or her remote computer and takes control of a local computer on the network. Once the remote user's remote computer is connected to the local network in a remote control system, the remote user actually uses the local computer, not the remote computer. That is, only user-interface data (e.g., screen images and keyboard/mouse input) are transferred to the remote computer from the local computer; the remote computer acts as a dumb terminal in a remote control system.

A remote control system is very different from the remote access system 10. In the remote access system 10, the remote computer 12 must perform adequately by itself, with enough processing power, memory, and disk storage space to run (on the remote computer 12 itself) the remote user's chosen applications without relying upon the on-network communication speed which typically is much higher than the speed of the telephone line link 22. Some telephone lines 22 allow speeds of up to 57.6 kilobits per second whereas the local computer network 14 can operate in ranges from 1 to 100 megabits per second depending on the type of network. The local computer network 14 can be, for example, Ethernet or Token Ring.

The remote computer 12 typically will have a serial port 32 which is managed by a serial controller such as a 16550A serial controller chip which can receive or transmit up to sixteen characters without intervention from the central processing unit (CPU) of the remote computer 12. The modem 24 connected to the serial port 32 can be, for example, a V.34 modem (28.8 kilobits per second) or an ISDN terminal adapter. The other modem 26 (which is not shown in FIG. 2 because it is internal to the remote access device 16) is selected to operate properly given the telephone lines 22 employed and the modem 24 connected to the serial port 32.

The network services and resources available on the network 14 which the remote user 18 might access via the remote access device 16 can include, for example, a Notes Server 46 and an E-Mail Server 48.

The remote computer 12 can be loaded with network application software 34 and remote access client software 36. The remote access client software 36 can allow, as a relevant example, a Unix-based computer to use a standard Point-to-Point Protocol (PPP) implementation, and a PC-based computer to use any standard (if any) or vendor-supplied remote access clients. A remote access client includes a "dialer" which establishes and terminates the remote access connection and a "driver" which interfaces with the network protocol stacks and the serial port 32 to send and receive network data. The remote access client can operate with a variety of protocols including IPX, TCP/IP, NetBEUI, LLC/802.2, and AppleTalk. Novell's IPX is the native protocol for NetWare. TCP/IP is widely used in Unix-based systems and client-server databases, and TCP/IP also is becoming standard for many other applications. NetBEUI is used for LAN Manager and Microsoft's Windows for Workgroups. LLC/802.2 is for IBM LAN Server and host connectivity. The combination of AppleTalk and TCP/IP covers almost all Macintosh applications.

Figure 3:
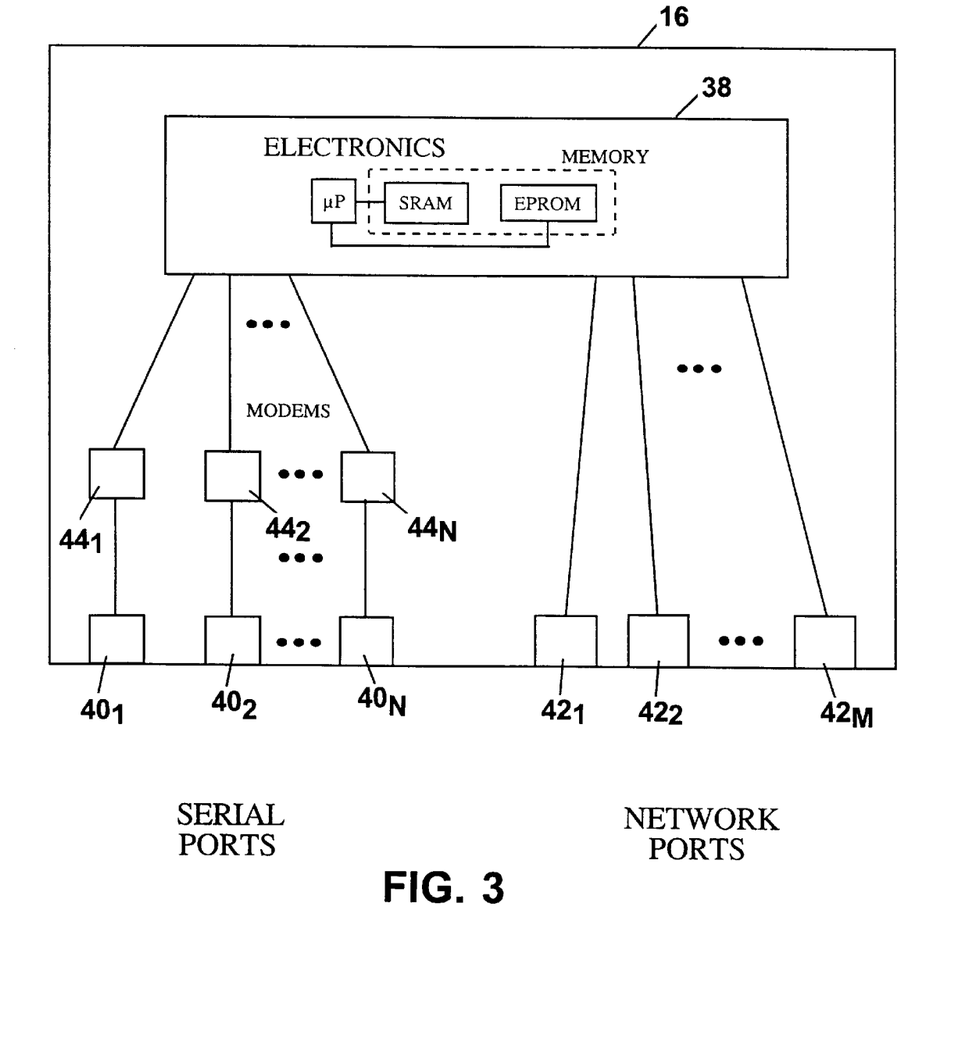
FIG. 3 is a block diagram showing major components of a remote access device according to the invention.

The performance of the remote access device 16 is primarily determined by the ability to move data through its serial ports (shown in FIG. 3 but not in FIG. 2) without much attention from its CPU (also shown in FIG. 3 but not in FIG. 2). The performance of the remote access device 16 also is determined by its CPU's ability to perform the routing, filtering, IP address tracking, etc. that the CPU must do without adding undue delays as it forwards data packets. The remote access device 16 thus has generally been optimized for serial port throughput and general CPU power. Because the remote access device 16 must be highly reliable and efficient, it includes solid-state, non-volatile storage for the controlling software. The software is upgradeable via downloading from the network 14 to the remote access device 16. The network manager can perform any upgrades.

The software in the remote access device 16 causes the remote access device 16 to perform the functionality described herein, although it should be noted that it is possible to use dedicated electronic hardware to perform all server functionality described herein. The steps which the server performs in order to provide a remote user at a remote computer with access to a local computer network according to the invention are described hereinafter, for example, with reference to FIGS. 4A and 4B.

FIG. 3 shows one embodiment of the remote access device 16. Other embodiments have different configurations. Referring to FIG. 3, the disclosed embodiment of the remote access device 16 includes electronics 38, a plurality of serial or high-speed digital communication ports $40_1$–$40_N$, and a plurality of network ports $42_1$–$42_M$. The remote access device 16 also can include a plurality of internal modems $44_1$–$44_N$. The serial ports 40 and the network ports 42 are controlled by the electronics 38.

The electronics 38 include, in some embodiments, a powerful Motorola 68000-family microprocessor and memory such as one or more megabytes of battery backed-up static random access memory (SRAM) and 64 kilobytes in an erasable programmable read only memory (EPROM).

Each of the serial communication ports 40 is for coupling with a communication device (e.g., the modem 26 of FIG. 1A), or for coupling directly with the telephone lines 22, to provide for communication with a remote computer (e.g., the remote computer 12 of FIGS. 1 and 2) over the telephone lines 22. A connecting cable can be used to couple a serial port 40 with the communication device or with the telephone lines. Each of the serial ports 40 can simultaneously be coupled to a different one of the one or more remote computers so as to provide simultaneous access to the local computer network 14 for each of the remote computers, even if each of the remote computers employs a different protocol (e.g., IPX, TCP/IP, AppleTalk, NetBEUI, or 802.2/LLC). In some embodiments, the remote access device 16 includes eight serial ports 40, each port 40 being a DB-25 asynchronous serial port which supports speeds of up to 115.2 kilobits per second (kbps), with an internal V.34 modem 44 associated with each.

Each of the network ports 42 is for coupling with a local computer network (e.g., the network 14 of FIGS. 1 and 2), via a connecting cable, to provide for communication with the network. Typically, the remote access device 16 is connected to only one network during normal operation, although it is possible with some embodiments to connect to more than one network. In some embodiments, the remote access device 16 includes three network ports 42, one for 10BaseT Ethernet, one for Thin Ethernet, and one for Thick Ethernet. In some other embodiments, the remote access device 16 includes a single network port 42 for Token Ring. In some other embodiments, the remote access device 16 includes a single network port 42 for use with Apple LocalTalk.

The remote access device 16 shown functionally in FIG. 3 can be contained in a housing similar to that shown in FIG. 2. The housing preferably is less than or equal to about 1.7 by 17 by 10 inches. Other housing sizes are possible. The housing can be made rack-mountable.

Figure 4A:
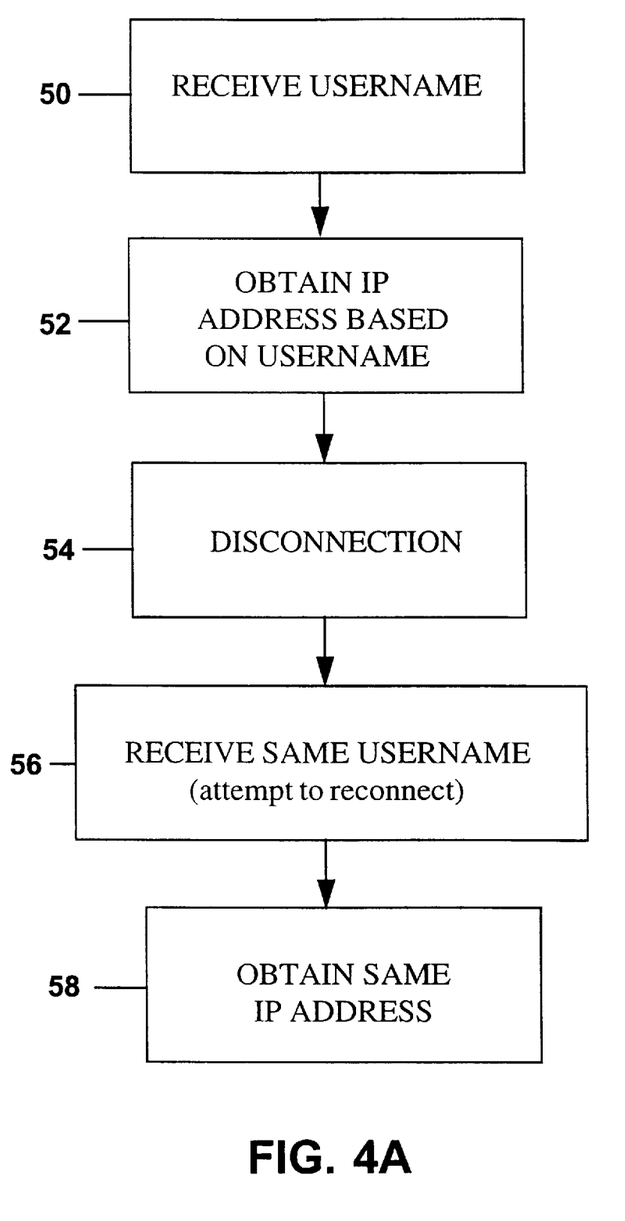
FIG. 4A is a flowchart for providing a remote user at a remote computer with the same IP address after reconnection to a local computer network according to the invention.

Referring to FIG. 4A, in accordance with the invention, the remote access device 16 receives the username 20 from the remote computer 12 attempting to gain access to the network 14 via the remote access device 16 (step 50). In a preferred embodiment, the username 20 uniquely identifies on the network 14 the user 18 of the remote computer 12. The remote access device 16 then obtains an IP address from the dynamic IP address assignment/management server 30 which dynamically assigns the IP address based on the username 20 (step 52). The remote access device 16 then passes the assigned IP address to the remote computer 16. The remote access device 16 thus acts as a proxy for the remote computer 12. The remote computer 12 then uses the IP address obtained by the remote access device 16 to communicate on the network 14 until the user 18 disconnects, or is disconnected, from the network 14 (step 54). If the user 18 attempts to reconnect to the network 14 by sending the same username 20 from the remote computer 12 to the same remote access device 16 or a different remote access device coupled directly to the network 14 (step 56), the remote access device receiving the same username 20 then obtains the same IP address from the dynamic IP address assignment/management server 30 (step 58). If the user 18 attempts to reconnect to the network 14 by sending the same username 20 from the remote computer 12 to a different remote access device, it generally is necessary that the same dynamic IP address assignment/management server 30 be reachable by both the first device 16 and this different device.

In accordance with the invention, the dial-in user 18 thus is provided upon reconnection with the same IP address as was dynamically assigned to the user 18 before disconnection. Also, this functionality is provided "across" remote access devices.

That is, the dial-in user 18 will receive the same IP address regardless of whether the user 18 re-gains access to the network 14 via the same remote access device that provided the user 18 with the network access before disconnection (e.g., remote access device $16_1$, FIG. 1B, both before disconnection and after reconnection) or via a remote access device different from the remote access device that provided the user 18 with the network access before disconnection (e.g., remote access device $16_1$ before disconnection and remote access device $16_3$ after reconnection), as long as the same IP address assignment server 30 can be reached by both remote access devices. In general, the reconnection must occur before the lease expires on the IP address dynamically assigned to the user's remote computer 12.

This reconnection feature allows the remote user to continue a dial-in session with minimal interruption. Providing this reconnection feature carries with it two consequences: (1) no users 18 can dial into the network 14 at the same time using the same username 20 and (2) the remote access devices 16 can not release an IP address when a user 18 disconnects. That is, this reconnection feature will not operate properly unless users 18 refrain from sharing usernames 20 and unless remote access devices 16 refrain from releasing IP addresses when a user 18 disconnects from the network 14. In general, if dial-in users 18 do share usernames 20 (i.e., if the usernames 20 do not uniquely identify the dial-in users 18 on the network 14), the reconnection feature will not work because then the server(s) 30 cannot identify uniquely and deterministically each of the dial-in users 18.

To reiterate and summarize, "reconnection" means that a remote user who disconnects from a remote access device on an IP network and then reconnects to any remote access device on the same IP network gets the same dynamically-assigned, server-supplied IP address as was dynamically assigned to that remote user before disconnection.

Hereinafter, the term "'ShivaJoe' mode" is used to identify a mode of operation of a remote access device according to invention in which the reconnection feature is active but username sharing is not allowed, and the term "'MAC+ index' mode" is used to identify a mode of operation of the remote access device in which the reconnection feature does not work but username sharing is allowed.

Figure 4B:
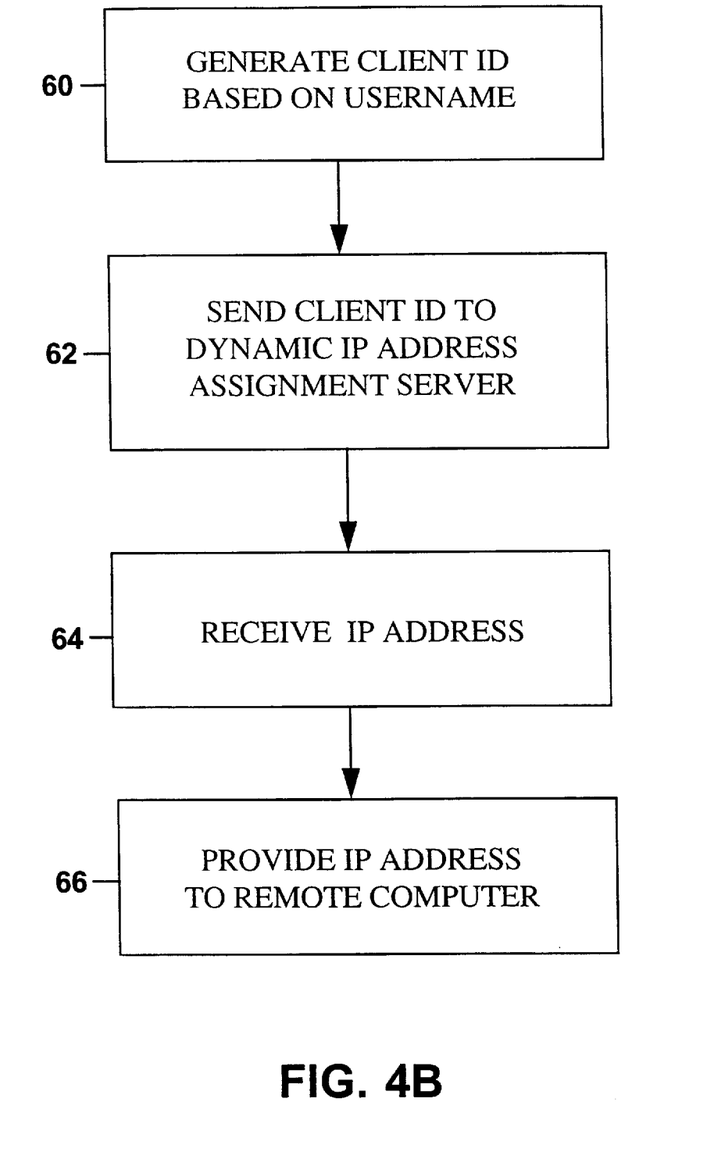
FIG. 4B is a flowchart showing details of a step in FIG. 4A in which an IP address is obtained from a dynamic IP address assignment server on the local computer network.

Referring to FIG. 4B, step 52 of FIG. 4A involves the remote access device 16 generating a client identifier based on the username 20 (step 60). In the preferred embodiment, because the username 20 uniquely identifies on the network 14 the user 18 of the remote computer 12, the client identifier also uniquely identifies the user 18. Also, in the preferred embodiment, the remote access device 16 generates the client identifier by concatenating the string "SHIVA" with the username 20. Thus, if the username 20 is the string "JOE", the client identifier would be "SHIVAJOE". After the client identifier is generated (step 60), the remote access device 16 sends the client identifier over the network 14 to the server 30 which dynamically assigns the IP address based on the client identifier (step 62). The remote access device 16 then receives the dynamically-assigned IP address from the server 30 (step 64). The user's remote computer 12 can now use that IP address to communicate on the network 14 (step 66). Step 58 of FIG. 4A involves the remote access device 16, or a different remote access device coupled directly to the network 14, performing essentially the same steps (i.e., steps 60, 62, 64 and 66) in order to provide the dial-in user 18 with the same IP address after disconnection from and upon reconnection to the network 14.

While the dynamic IP address assignment server 30 has been described as providing IP addresses only, the invention also contemplates receiving at the remote access devices 16 other configuration information from the server 30 in addition to just the IP addresses. In addition to IP addresses, the configuration information can include standard IP parameters, other standard parameters, and vendor-specific information.

Further details of the operation of a remote access system and a remote access device according to the invention follow.

In its database, a DHCP server 30 associates each allocated IP address with a handle. The handle is extracted by the server 30 from a DHCP DISCOVER packet forwarded to the server 30 over the network 14 by participant (i.e., client) on the network 14. RFC 1541 stipulates that the handle may come from either the "client hardware address" field (which is mandatory) or the "client ID field" (which is optional). This RFC also indicates that if the client ID field is present, it should be used as the identifier.

To interoperate with a dynamic IP address assignment server 30 such as a DHCP server, the remote access device 16 according to the invention must manage multiple DHCP-supplied IP addresses for its dial-in users 18. Therefore, the remote access device 16 cannot use its MAC address as the handle, and the client ID option is needed.

RFC 1533 describes the format of the client ID option. This option includes a "type" specified. Presently, only type 1 is specified. A type 1 option ID field consists of a MAC address. For the reasons mentioned previously, this is not a sufficient ID handle for the remote access device 16.

RFC 1541 indicates that additional client ID options may be defined. Fortunately, the client ID option is treated by the DHCP server 30 as an opaque string. Therefore, the remote access device 16 according to the invention can define and utilize a new option and still interoperate with DHCP servers 30.

The remote access device 16 according to the invention uses two forms of client IDs. With the first form, known as "MAC+index" mode, multiple unique client handles are guaranteed by concatenating the remote access device's MAC address with a four-byte index. This "MAC+index" mode does not, however, guarantee the reconnection feature, although username sharing is allowed in this mode. With the second form, known as "Shivajoe" mode, deterministic client IDs are guaranteed by concatenating the string "Shiva" with the username. Including "Shiva" prevents collision with other vendors' client ID schemes. This "ShivaJoe" mode guarantees the reconnection feature, but it does not allow username sharing. Tables 1 and 2 show the client ID formats for the remote access device's two modes of operation.

TABLE 1

"MAC + index" client ID format

|  | OPT | LEN | TYPE | B1 | B2 | B3 | B4 | B5 | B6 | B7 | B8 | B9 | B10 |
|---|---|---|---|---|---|---|---|---|---|---|---|---|---|
| Format | 61 | 11 | 0 | MAC1 | MAC2 | MAC3 | MAC4 | MAC5 | MAC6 | IND1 | IND2 | IND3 | IND4 |
| Ex. | 61 | 11 | 0 | 00 | 80 | D3 | A0 | B0 | C0 | 00 | 00 | 00 | 01 |

TABLE 2

"ShivaJoe" client ID format

|  | OPT | LEN | TYPE | B1 | B2 | B3 | B4 | B5 | B6 | B7 | B8 |
|---|---|---|---|---|---|---|---|---|---|---|---|
| Format | 61 | ? | 0 | "S" | "H" | "I" | "V" | "A" | USR1 | USR2 | USR3 |
| Example | 61 | 9 | 0 | "S" | "H" | "I" | "V" | "A" | "J" | "O" | "E" |

When a client dials in, the remote access device according to the invention obtains and provides to the client an IP address. When the client disconnects, the IP address it was using may be released if the remote access device is operating in the "MAC+index" mode, however, if it is operating in the "ShivaJoe" mode, the IP address generally is not released. The remote access device is responsible for interacting with the DHCP server to manage its DHCP IP addresses. This includes requesting and renewing IP address leases, as well as releasing addresses in the event of a scheduled reboot or if the remote access device obtains IP addresses on an as-needed basis.

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. A method implemented by a remote access device which provides a remote computer access to a computer network located remotely from the remote computer, said method comprising:

receiving a username sent from the remote computer which is attempting to gain access through the remote access device to the computer network, the username uniquely identifying on the computer network a user of the remote computer;

in response to receiving the username, using a rule to construct an identifier from the username;

sending said identifier to a server on the computer network which dynamically assigns Internet Protocol (IP) addresses;

in response to sending the identifier, obtaining an assigned IP address from the server, the assigned IP address uniquely identifying the remote computer on the computer network and needed by the remote computer to communicate on the computer network;

if the remote computer disconnects or is disconnected from the computer network, again receiving the username from the remote computer when it attempts to regain access to the computer network;

in response to again receiving the username, using said rule to construct said identifier from the username;

again sending said identifier to said server; and obtaining the same IP address from the server in response to the remote computer attempting to re-gain access to the computer network by sending the same username.

2. The method of claim 1 wherein the step of obtaining the IP address from the server comprises:

generating a client identifier based on the username, the client identifier uniquely identifying the remote computer on the computer network;

sending the client identifier to the server which dynamically assigns the IP address based on the client identifier; and receiving the IP address from the server.

3. The method of claim 2 wherein the step of obtaining the IP address from the server comprises obtaining the IP address from a dynamic host configuration protocol (DHCP) server.

4. A method implemented by a remote access device which provides a remote computer access to a computer network located remotely from the remote computer, said method comprising:

receiving a username from the remote computer which is attempting to gain access through the remote access device to the computer network, the username uniquely identifying on the computer network a user of the remote computer;

in response to receiving the username, using a rule to generate a client identifier from the username, wherein said client identifier is different from the username and uniquely identifies the remote computer on the computer network;

sending the client identifier to a server on the computer network which dynamically assigns an Internet protocol (IP) address based on the client identifier, said IP address uniquely identifying the remote computer on the computer network and needed by the remote computer to communicate on the computer network;

in response to sending the client identifier, receiving said IP address from the server; and providing said IP address to the remote computer which uses the IP address to communicate on the computer network.

5. The method of claim 4 further comprising:

after providing said IP address to the remote computer, becoming disconnected from the remote computer so that the remote computer cannot communicate on the computer network;

receiving the username when the user attempts to regain access to the computer network after the remote computer has become disconnected;

in response to again receiving the username, using said rule to again generate said client identifier;

again sending the client identifier to the server;

in response to again sending the client identifier to the server, again receiving said IP address from the server; and again providing said IP address to the remote computer to again allow communication by the remote computer on the computer network.

6. The method of claim 4 wherein each of the steps of generating said client identifier comprises concatenating the username with a predetermined string to generate said client identifier.

7. The method of claim 4 wherein each of the steps of receiving said IP address from the server comprises receiving a plurality of configuration parameters which includes said IP address.

8. The method of claim 4 wherein each of the steps of receiving said IP address from the server comprises receiving the IP address from a dynamic host configuration protocol (DHCP) server.

9. A method for providing a remote client computer with remote access through a remote access device to a computer network that is remote from the remote client computer, said method comprising:

transmitting a username from the remote client computer over a remote communications link to the remote access device coupled to the remote communications link and the computer network, the username uniquely identifying a user of the remote client computer;

receiving the username at the remote access device;

generating, at the remote access device and based on the username, a client identifier uniquely identifying the remote client computer on the computer network;

sending the client identifier over the computer network from the remote access device to a server coupled to the computer network;

receiving the client identifier at the server;

dynamically assigning at the server an Internet protocol (IP) address based on the client identifier;

sending said IP address over the computer network from the server back to the remote access device;

receiving said IP address at the remote access device; and providing said IP address to the remote computer which uses said IP address to communicate on the computer network.

10. The method of claim 9 further comprising:

transmitting the username from the remote client computer over another remote communications link to a target remote access device after the remote client computer has disconnected, or has been disconnected, from the computer network such that the remote client computer cannot communicate on the computer network, wherein said target remote access device is a member of the group consisting of said remote access device and at least one other remote access device;

receiving the username at said target remote access device;

generating said client identifier at said target remote access device based on the username;

sending said client identifier over the computer network from the target remote access device to the server;

receiving the client identifier at the server;

assigning said IP address based on the client identifier;

sending said IP address over the computer network from the server to the target remote access device;

receiving said IP address at the target remote access device; and providing said IP address to the remote computer which uses the IP address to again communicated on the computer network.

11. The method of claim 9 wherein the step of generating the client identifier comprises the remote access device concatenating the username with a predetermined string to generate the client identifier.

12. The method of claim 9 wherein the steps of sending and receiving the IP address comprise sending and receiving a plurality of configuration parameters which includes the IP address.

13. The method of claim 9 wherein the steps of sending the IP address comprises sending the IP address from a dynamic host configuration protocol (DHCP) server.

14. Apparatus for providing remote access, comprising:

a remote communications link;

a remote client computer for transmitting a username over the remote communications link, the username uniquely identifying a user at the remote client computer;

a computer network located remote from the remote client computer;

a remote access device, coupled to the remote communications link and the computer network, for receiving the username from the remote communications link and generating a client identifier based on the username, the client identifier uniquely identifying the remote client computer on the computer network; and a server, coupled to the computer network, for receiving the client identifier, dynamically assigning an internet protocol (IP) address based on the client identifier, and passing the IP address to the remote access device via the computer network, the IP address uniquely identifying the remote client computer on the computer network and allowing the remote client computer to communicate on the computer network via the remote access device.

15. The apparatus of claim 14 wherein the remote access device concatenates the username with a predetermined string to generate the client identifier.

16. The apparatus of claim 14 wherein the server passes to the remote access device via the computer network a plurality of configuration parameters which includes the IP address.

17. The apparatus of claim 14 wherein the server is a dynamic host configuration protocol (DHCP) server.

18. The apparatus of claim 14 further comprising:

a second remote communications link; and a second remote access device, coupled to the second remote communications link and the computer network, for receiving the username from the second remote communications link when the username is transmitted thereover by the remote client computer after the remote client computer disconnects or is disconnected from the computer network, the second remote access device also for generating the client identifier based on the username;

the server receiving the client identifier, dynamically assigning the IP address based on the client identifier, and passing the IP address to the second remote access device via the computer network to allow the remote client computer to again communicate on the computer network via the second remote access device.

19. The apparatus of claim 14 wherein the remote access device also is for receiving the username from the same or a different remote communications link when the username is transmitted thereover by the remote client computer after the remote client computer disconnects or is disconnected from the computer network, the remote access device again generating the client identifier based on the username; and wherein the server receives the client identifier, dynamically assigns the IP address based on the client identifier, and passes the IP address to the remote access device via the computer network to allow the remote client computer to again communicate on the computer network via the remote access device.

20. The method of claim 1 wherein each of the steps of using the rule to construct said identifier comprises concatenating the username with a predetermined string to generate said identifier.

* * * * *